United States Patent
Nishio

(10) Patent No.: US 10,065,805 B2
(45) Date of Patent: Sep. 4, 2018

(54) MOLDED ARTICLE SUPPLY APPARATUS

(71) Applicant: NISSEI ASB MACHINE CO., LTD., Komoro-shi, Nagano (JP)

(72) Inventor: Yuta Nishio, Komoro (JP)

(73) Assignee: NISSEI ASB MACHINE CO., LTD., Komoro-Shi, Nagano (JP)

( * ) Notice: Subject to any disclaimer, the term of this patent is extended or adjusted under 35 U.S.C. 154(b) by 0 days.

(21) Appl. No.: 15/515,518

(22) PCT Filed: Sep. 18, 2015

(86) PCT No.: PCT/JP2015/076801
§ 371 (c)(1),
(2) Date: Mar. 29, 2017

(87) PCT Pub. No.: WO2016/052280
PCT Pub. Date: Apr. 7, 2016

(65) Prior Publication Data
US 2017/0225905 A1   Aug. 10, 2017

(30) Foreign Application Priority Data

Sep. 30, 2014   (JP) .................................. 2014-201856

(51) Int. Cl.
*B65G 47/52*   (2006.01)
*B65G 47/74*   (2006.01)
(Continued)

(52) U.S. Cl.
CPC .............. *B65G 47/52* (2013.01); *B29C 49/06* (2013.01); *B29C 49/38* (2013.01); *B29C 49/42* (2013.01);
(Continued)

(58) Field of Classification Search
None
See application file for complete search history.

(56) References Cited

U.S. PATENT DOCUMENTS

| 4,693,375 A | 9/1987 | Schweers |
| 5,869,110 A * | 2/1999 | Ogihara .................. B29C 49/28 264/520 |

(Continued)

FOREIGN PATENT DOCUMENTS

| GB | 2 022 536 | 12/1979 |
| JP | 54-143470 | 11/1979 |

(Continued)

OTHER PUBLICATIONS

International Search Report from the European Patent Office for International Application No. PCT/JP2015/076801, dated Dec. 28, 2015.

(Continued)

*Primary Examiner* — Kavel Singh
(74) *Attorney, Agent, or Firm* — Finnegan, Henderson, Farabow, Garrett & Dunner LLP

(57) ABSTRACT

A molded article supply apparatus is provided in a transport device 30 having transport members 20 on which molded articles 1 having mouths 2 are held in an inverted state, with the mouths 2 facing downward, and which are provided with rod members 22 to be inserted into the molded articles 1; and a transport path 31 on which the transport members 20 are continuously transported. The molded article supply apparatus comprises a supply unit 110 disposed above the transport path 31, for holding the molded articles 1 at predetermined intervals and lowering the molded articles 1, while transporting the molded articles 1 in synchronization with movement of the transport members 20, to supply the molded articles 1 to the transport members 20.

7 Claims, 7 Drawing Sheets

(51) Int. Cl.
  *B65G 47/90* (2006.01)
  *B29C 49/06* (2006.01)
  *B29C 49/38* (2006.01)
  *B29C 49/42* (2006.01)

(52) U.S. Cl.
  CPC .......... *B29C 49/4205* (2013.01); *B65G 47/90* (2013.01)

(56) References Cited

U.S. PATENT DOCUMENTS

| | | | | |
|---|---|---|---|---|
| 5,902,612 A | * | 5/1999 | Ogihara | B29C 49/4205 425/526 |
| 6,848,899 B2 | * | 2/2005 | Takada | B29C 49/06 425/526 |

FOREIGN PATENT DOCUMENTS

| | | |
|---|---|---|
| JP | 4-69226 | 3/1992 |
| JP | 2004-284016 | 10/2004 |
| WO | WO 03/008176 | 1/2003 |
| WO | WO 2012/029528 | 3/2012 |
| WO | WO 2015/066506 A2 | 5/2015 |

OTHER PUBLICATIONS

Notification of Reasons for Refusal issued by the Japan Patent Office in corresponding Japan Application No. 2016-529418, dated Oct. 17, 2017 (7 pages).

Extended European Search Report pursuant to Rule 62 EPC, the Supplementary European Search Report (Art. 153(7) EPC) and the European Search Opinion issued in related foreign Application No. 15846929.6-1014/3202691 (PCT/JP2015076801); dated May 11, 2018 (9 pgs.).

* cited by examiner

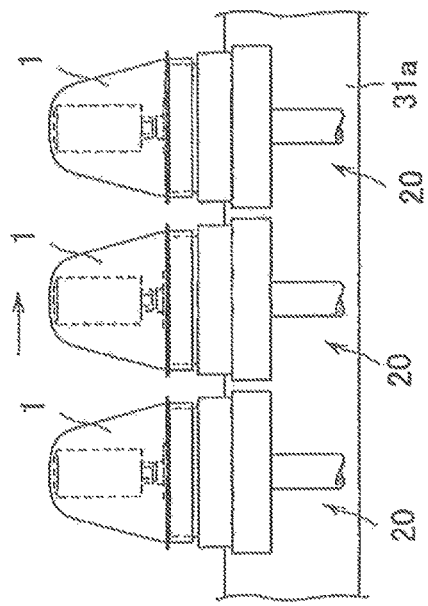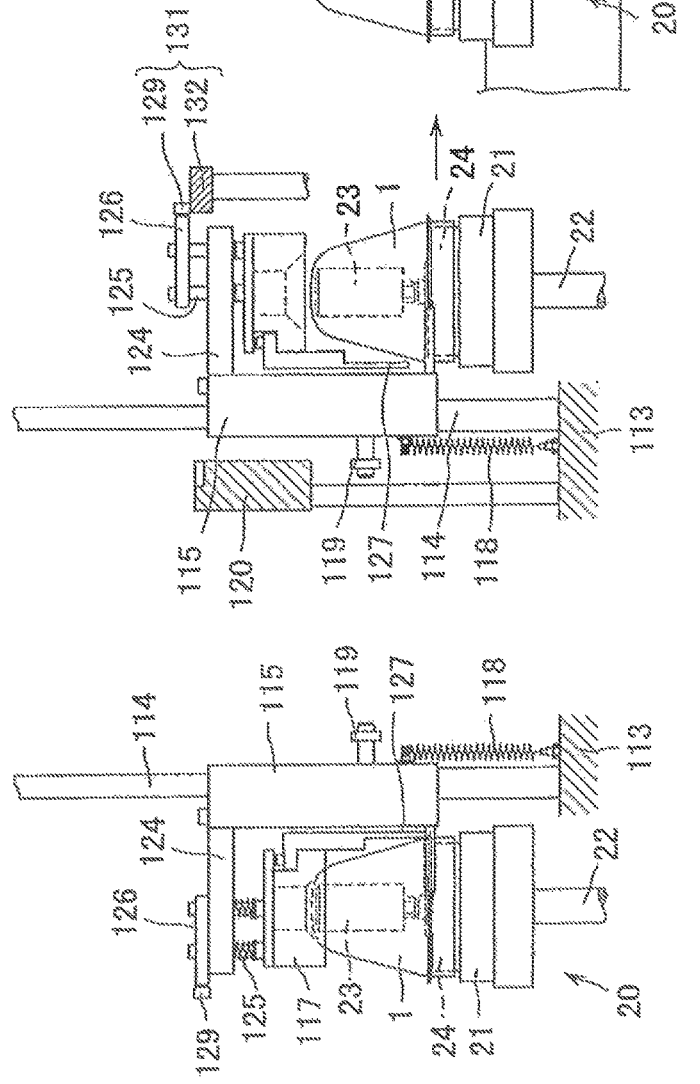
FIG. 4

MOLDED ARTICLE SUPPLY APPARATUS

TECHNICAL FIELD

This invention relates to a molded article supply apparatus for supplying molded articles each having a mouth, such as wide-mouthed preforms, to transport members, which are continuously transported along a transport path, in an inverted state with the mouth facing downward.

BACKGROUND ART

As containers made of resin, such as PET (polyethylene terephthalate), narrow-mouthed containers for drinking have been common. In recent, years, the range of uses for resin containers has become expanded. Currently, there are not only narrow-mouthed containers for drinking, but also so-called jar type wide-mouthed containers, for example, for storage of foods or for cosmetics. The wide-mouthed container refers to a container in which the ratio of the outer diameter of the mouth (neck) to the outer diameter of a barrel is relatively high in comparison with the narrow-mouthed container for drinking. In particular, the container with the outer diameter of the mouth being, for example, 43 mm or more is generally called a wide-mouthed container.

Such a wide-mouthed container is produced using a preform of a larger size than a preform for producing a narrow-mouthed container. Thus, the preform for producing a wide-mouthed container (will hereinafter be referred to as a wide-mouthed preform) is relatively heavyweight. The size (outer diameter) of a flange to be provided at the mouth of the wide-mouthed preform is relatively small. That is, the ratio of the diameter of the flange to the outer diameter of the mouth is relatively low. In a state in which the preform is held, with the mouth facing upward, therefore, there has been a problem such that it is difficult to supply the wide-mouthed preform to a transport path provided in a crystallization device or a molding device, or to transport the wide-mouthed preform on the transport path.

In the field of wide-mouthed containers, there has been a desire for an increase in a filling volume, namely, further upsizing of a wide-mouthed container. To achieve the upsizing of the wide-mouthed container, it is also necessary to upsize a wide-mouthed preform. In this case, the above-mentioned problem with supply or transport is apt to occur.

To solve such a problem, the present applicant developed a mouth crystallization apparatus equipped with a device for holding wide-mouthed preforms, in an inverted state with the mouths facing downward, by transport members and transporting the transport members along a transport path (see Patent Document 1).

With this apparatus, the transport member has a transport stand to be supplied with the wide-mouthed preform in an inverted state, and is also equipped with a pushup portion, a core, etc, which can be raised and lowered by an elevating/lowering rod. The pushup portion and core are located above the transport stand when the elevating/lowering rod is at an ascent position, and they are located below the transport stand when the elevating/lowering rod is at a descent position. The wide-mouthed preform is supplied to the transport stand when the elevating/lowering rod is at the descent position, and is held by the transport member when the elevating/lowering rod is then raised to the ascent position.

PRIOR ART DOCUMENTS

Patent Documents

Patent Document 1: Domestic Republication of PCT International Application WO2012/029528

SUMMARY OF THE INVENTION

Problems to be Solved by the Invention

With the above apparatus, however, the supply height of the wide-mouthed preform and the transport height of the transport member are nearly the same. This requires that the elevating/lowering rod be raised or lowered over a relatively long distance when the wide-mouthed preform is supplied to the transport member. Thus, the elevating/lowering rod and related components such as a bearing related thereto increase in the degree of wear and, further, their risk of damage may increase. If the wide-mouthed preform is upsized, in particular, such problems are apt to occur, because the distance over which the elevating/lowering rod ascends or descends becomes long.

The present invention has been accomplished in the light of the foregoing circumstances. It is an object of the invention to provide a molded article supply apparatus which can supply molded articles to transport members satisfactorily without raising or lowering an elevating/lowering rod.

Means for Solving the Problems

A first aspect of the present invention, aimed at solving the above problems, is a molded article supply apparatus provided in a transport device, the transport device having transport members on which molded articles having mouths are held in an inverted state, with the mouths facing downward, and which are provided with rod members to be inserted into the molded articles; and a transport path on which the transport members are continuously transported, the molded article supply apparatus comprising a supply unit disposed above the transport path, for holding the molded articles at predetermined intervals and lowering the molded articles, while transporting the molded articles in synchronization with movement of the transport members, to supply the molded articles to the transport members.

A second aspect of the present invention is the molded article supply apparatus according to the first aspect, wherein the supply unit has a rotating member provided to be rotatable in accordance with a moving speed of the transport member; holding portions provided at predetermined intervals on an outer periphery of the rotating member, for holding the molded articles; and a first elevating/lowering portion for raising or lowering each of the holding portions at a predetermined timing.

A third aspect of the present invention is the molded article supply apparatus according to the second aspect, wherein the molded article has a barrel continuous with the mouth, a flange for separating the mouth and the barrel, and a bottom closing the barrel; and the holding portion has a first support member for supporting the flange of the molded article from below, and a second support member for engaging the bottom of the molded article from above for support thereof.

A fourth aspect of the present invention is the molded article supply apparatus according to the third aspect, further comprising a slide transport unit for slidingly transporting the molded article to the holding portion, wherein the supply unit has a second elevating/lowering portion for temporarily raising the second support member to a position above the molded article in a delivery region where the molded article is delivered from the slide transport unit to the holding portion.

A fifth aspect of the present invention is the molded article supply apparatus according to the fourth aspect, wherein the supply unit has a third elevating/lowering portion for temporarily raising the second support member to a position above the molded article in a supply region where the molded article is supplied from the holding portion to the transport member.

A sixth aspect of the present invention is the molded article supply apparatus according to any one of the third to fifth aspects, wherein the second support member further has a contact portion which contacts an upper surface of the flange, when the second support member supports the bottom of the molded article.

Effects of the Invention

According to the molded article supply apparatus of the present invention described above, the molded articles such as wide-mouthed preforms can be supplied satisfactorily to the transport members provided with the rod members. That is, the molded articles can be supplied to the transport members satisfactorily without the ascent or descent of the rod members.

BRIEF DESCRIPTION OF THE DRAWINGS

FIGS. 4(a), 4(b) are views illustrating the state of the holding portion constituting the molded article supply apparatus according to the present invention.

MODE FOR CARRYING OUT THE INVENTION

An embodiment of the present invention will now be described in detail by reference to the accompanying drawings.

Figure 1:
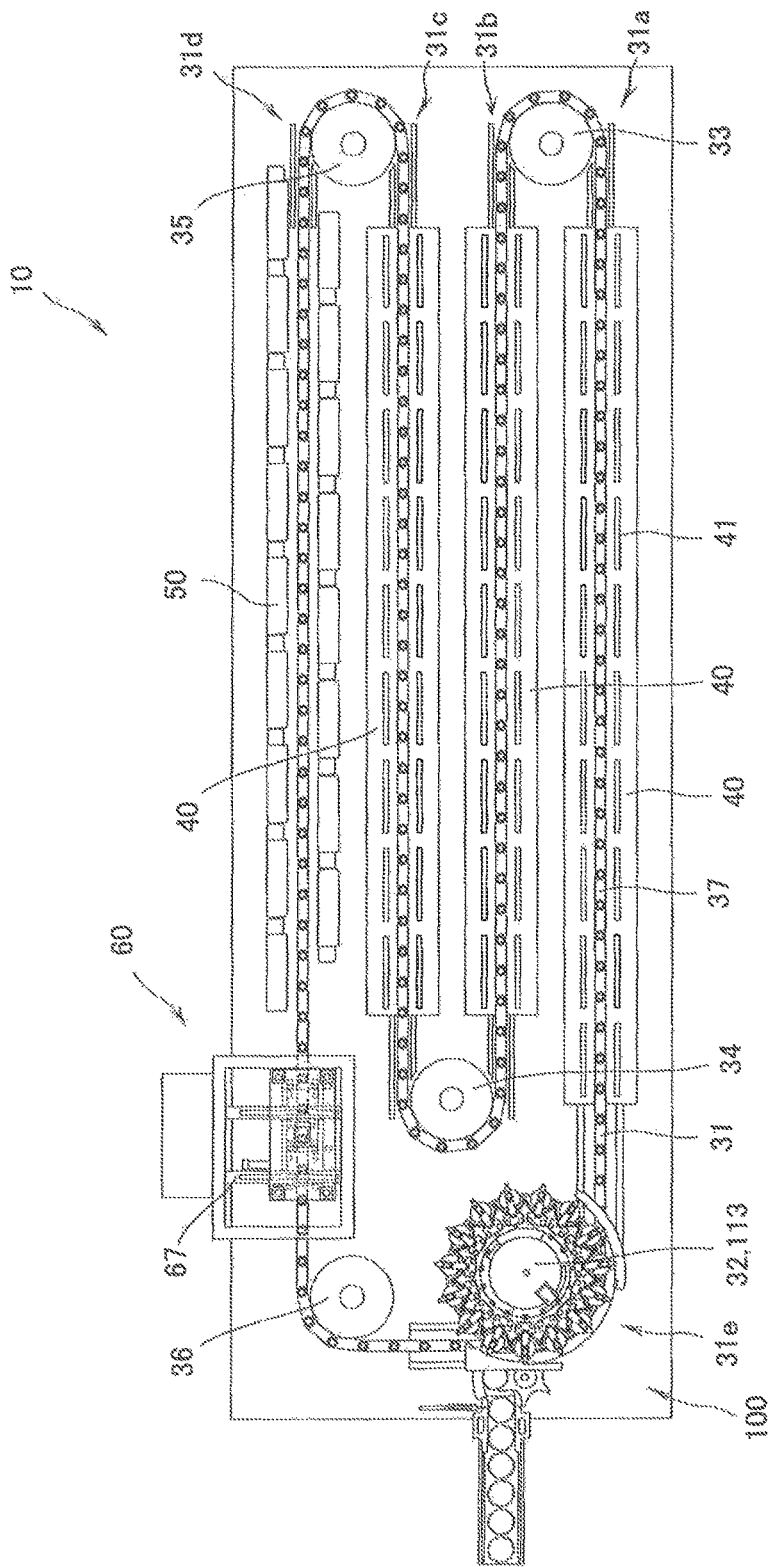
FIG. 1 is a plan view showing a mouth crystallization apparatus equipped with a molded article supply apparatus according to the present invention.

A mouth crystallization apparatus 10 shown in FIG. 1 is an apparatus for crystallizing the mouth of a wide-mouthed preform (molded article) for use in the manufacture of a wide-mouthed container, for example, those for food storage and for cosmetics. The mouth crystallization apparatus 10 is equipped with a transport unit (transport device) 30 including a loop-shaped (endless) transport path 31 for continuously transporting transport members 20 (see FIG. 2, FIGS. 3(a), 3(b)) bearing wide-mouthed preforms 1. The mouth crystallization apparatus 10 is also provided with a molded article supply apparatus 100 as a supply unit for supplying the wide-mouthed preforms 1 to the transport members 20 which are transported on the transport path 31.

The mouth crystallization apparatus 10 is further equipped with a heating unit 40 for heating the wide-mouthed preforms 1 to be transported along the transport path 31 by the transport members 20, a cooling unit 50 for cooling the wide-mouthed preforms 1 heated by the heating unit 40, and a withdrawal unit 60 for withdrawing the wide-mouthed preforms 1 from the transport members 20 being transported on the transport path 31. The heating unit 40, cooling unit 50, and withdrawal unit 60 are arranged in this order along the transport path 31 downstream of the molded article supply apparatus 100.

The present invention is characterized by the configuration of the molded article supply apparatus 100 provided in the mouth crystallization apparatus 10, and the molded article supply apparatus 100 will mainly be described below. Since the features of the transport member 20, transport unit 30, heating unit 40, and cooling unit 50 are existing features, they will be briefly described below (see, if necessary, Domestic Republication of PCT International Application WO2012/029528 which is the prior application by the present applicant).

The transport unit 30 is equipped with a single driving sprocket 32, first to fourth driven sprockets 33 to 36, and an endless member, for example, a driving chain 37. The driving chain 37 is looped horizontally over the driving sprocket 32 and the first to fourth driven sprockets 33 to 36 to form the loop-shaped transport path 31. In the present embodiment, the driving sprocket 32 and the first to fourth driven sprockets 33 to 36 are arranged at predetermined positions to form the transport path 31 including first to fourth linear transport paths 31a to 31d which are parallel to one another and in which two adjacent directions of transport are opposite to each other.

Concretely, the driving sprocket 32 is disposed at the upstream end of the first linear transport path 31a. The first driven sprocket 33 is disposed at the downstream end of the first linear transport path 31a (the upstream end of the second linear transport path 31b). The second driven sprocket 34 is disposed at the downstream end of the second linear transport path 31b (the upstream end of the third linear transport path 31c). The third driven sprocket 35 is disposed at the downstream end of the third linear transport path 31c (the upstream end of the fourth linear transport path 31d). The fourth driven sprocket 36 is disposed at the downstream end of the fourth linear transport path 31d.

In the present embodiment the heating units 40 are provided in the first to third linear transport paths 31a to 31c, while the cooling unit 50 and the withdrawal unit 60 are provided in the fourth linear transport path 31a. The molded article supply apparatus 100 is provided upstream of the heating units 40 on the transport path 31 and, in the present embodiment, is provided at a position corresponding to the driving sprocket 32, that is, in correspondence with a curved transport path 31e for transporting the transport member 20 in a curve.

The wide-mouthed preform 1 has a mouth 2, a barrel 3 continuous with the mouth 2, a flange 4 separating the mouth 2 and the barrel 3, and a bottom 5 closing the barrel 3, and is supplied to the transport member 20 in an inverted state in which the mouth 2 faces downward (see FIGS. 3(a), 3(b)).

The transport member 20 has a transport stand 21 which is supported by the driving chain 37, although this is not shown, and on which the wide-mouthed preform 1 in an inverted state is placed. The transport member 20 has an elevating/lowering rod (rod member) 22 capable of ascending and descending. At the upper end of the elevating/lowering rod 22, a pushup member 23 is provided which contacts the inner surface of the bottom 5 of the wide-mouthed preform 1 to push the wide-mouthed preform 1 upward. When the elevating/lowering rod 22 is raised to a predetermined position, the pushup member 23 pushes up the bottom 5 of the wide-mouthed preform 1 to bring the wide-mouthed preform 1 out of contact with the transport stand 21. Since a core 24 is fixed to the elevating/lowering rod 22, moreover, the core 24 is inserted into the mouth 2 of the wide-mouthed preform 1 by raising the elevating/lowering rod 22 to the predetermined position.

Figure 2:
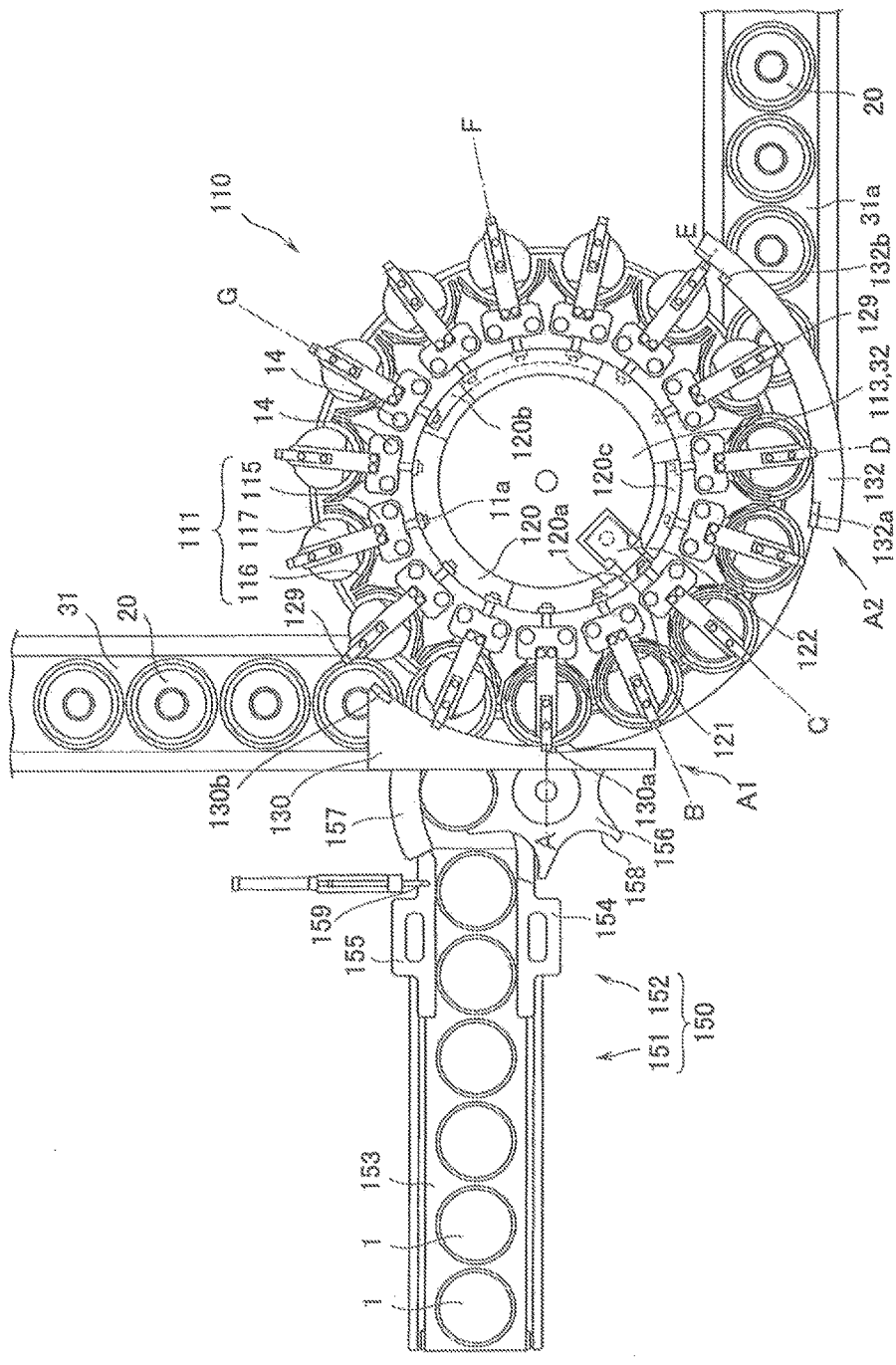
FIG. 2 is a plan view showing the molded article supply apparatus according to the present invention.
Figure 3:
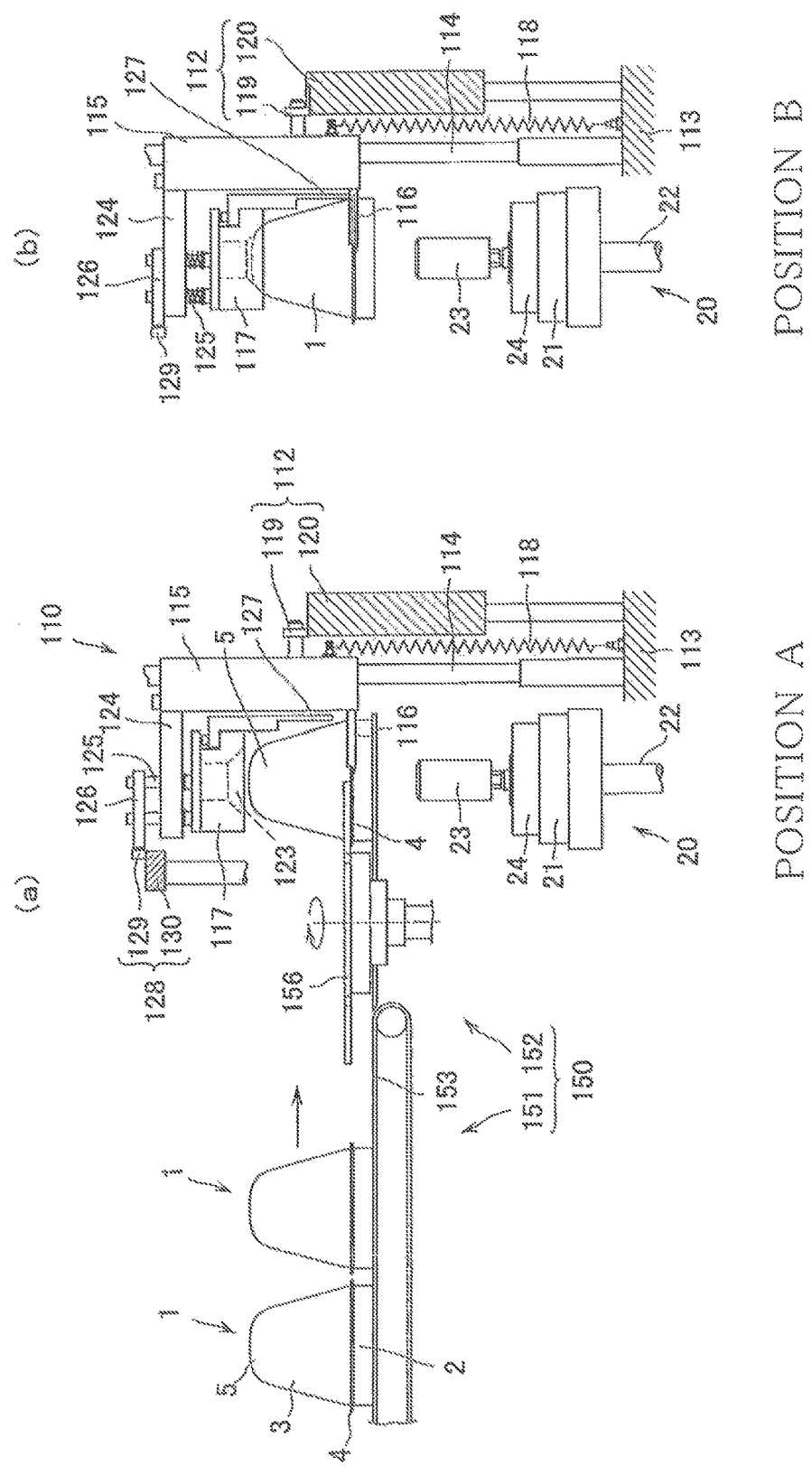
FIGS. 3(a), 3(b) are views illustrating the state of a holding portion constituting the molded article supply apparatus according to the present invention.
Figure 5:
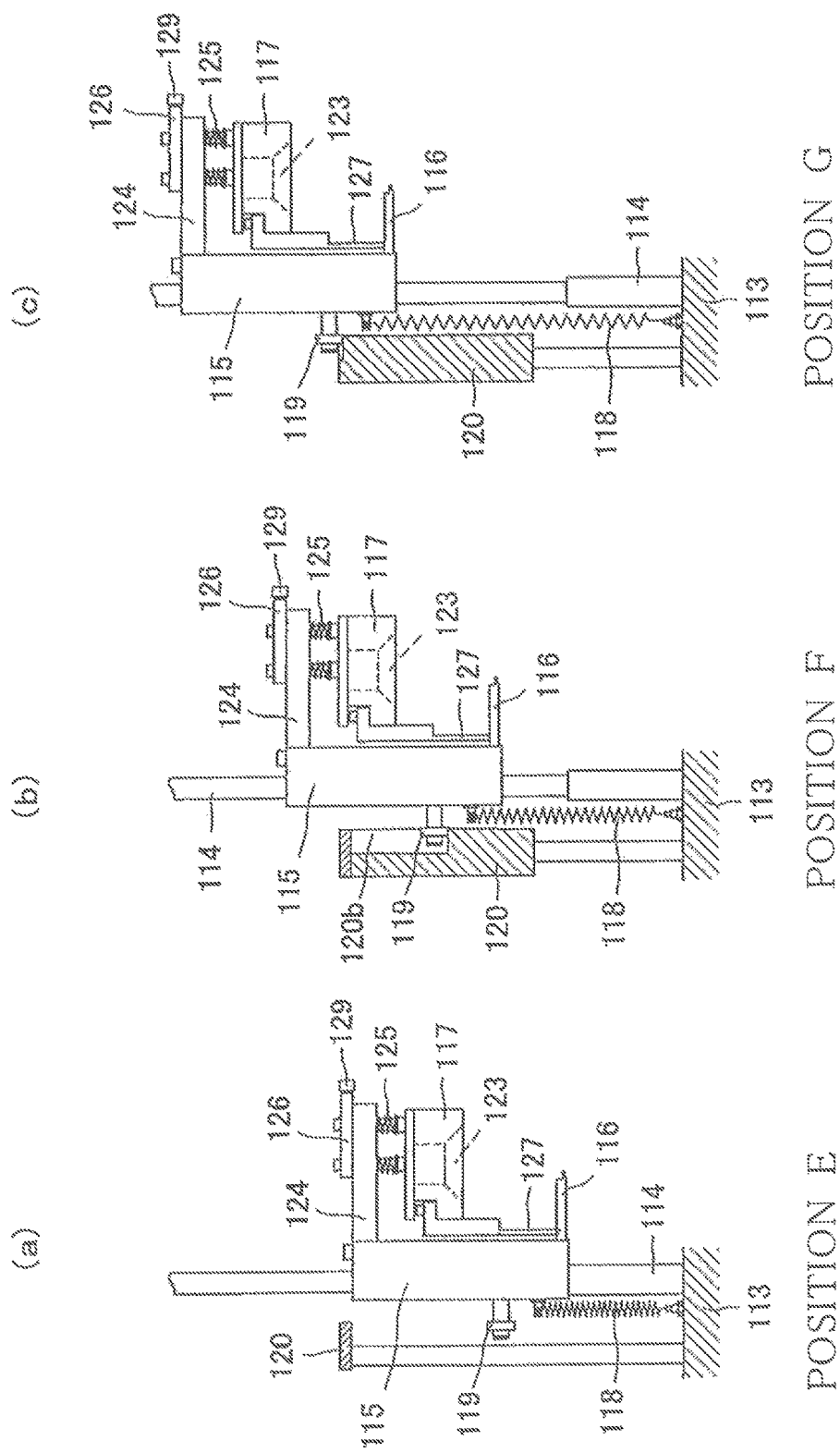
FIG. 5(a) to 5(c) are views illustrating the state of the holding portion constituting the molded article supply apparatus according to the present invention.

Next, the molded article supply apparatus 100 for supplying the wide-mouthed preform 1 to the transport member 20 of the above configuration will be described. The molded article supply apparatus 100 is provided at the position corresponding to the driving sprocket 32, that is, provided in correspondence with the curved transport path 31e for transporting the transport member 20 in a curve, as shown in FIGS. 1 and 2.

The molded article supply apparatus 100 is equipped with a supply unit 110 which is disposed by a predetermined distance above the transport path 31 (see FIG. 2), holds the wide-mouthed preforms 1, as molded articles, at predetermined intervals, and transports and lowers the wide-mouthed preforms 1 in synchronization with the movement of the transport members 20 to supply them to the transport members 20; and a slide transport unit 150 for transporting the wide-mouthed preforms 1 from the outside to the supply unit 110.

The slide transport unit 150, in the present embodiment, is equipped with a linear transport portion 151 for linearly transporting the wide-mouthed preforms 1, and a rotary transport portion 152 for rotationally transporting the wide-mouthed preforms 1. The linear transport portion 151 is composed of a belt conveyor 153, for example, for continuously transporting a plurality of the wide-mouthed preforms 1 slidingly. At the border of the linear transport portion 151 with the rotary transport portion 152, a first linear guide 154 and a second linear guide 155 are provided on both sides of the transport path where the wide-mouthed preforms 1 pass (see FIG. 2). In other words, the transport path for passage of the wide-mouthed preforms 1 is formed by the first linear guide 154 and the second linear guide 155. The wide-mouthed preforms 1 slidingly transported in the linear transport portion 151 are passed between the first linear guide 154 and the second linear guide 155, whereby the are arranged in a line and sent to the rotary transport portion 152.

The rotary transport portion 152 has a star wheel 156 provided beside the first linear guide 154 of the transport path, and an arcuate guide 157 provided beside the second linear guide 155 of the transport path. That is, in the rotary transport portion 152, the transport path for passage of the wide-mouthed preforms 1 is formed by the star wheel 156 and the arcuate guide 157. The wide-mouthed preforms 1 slidingly transported in the rotary transport portion 152 are lined up at predetermined intervals (pitch) by the star wheel 156 and the arcuate guide 157 for feeding to the supply unit 110.

In the present embodiment, a predetermined number of (e.g., six) arcuate notches 158 are formed in the outer periphery of the star wheel 156. By acceptance of the wide-mouthed preforms 1 into these notches 158, the wide-mouthed preforms 1 are lined up at the predetermined intervals. The star wheel 156 is rotationally driven by a drive means (not shown) in synchronization with the movement of the transport members 20, namely, in synchronization with the rotation of the driving sprocket 32.

In the present embodiment, moreover, a stopper pin 159 for restraining the movement of the wide-mouthed preform 1 is provided near the boundary between the linear transport portion 151 and the rotary transport portion 152. The stopper pin 159 is driven by an actuator device (not shown) and, when the slide transport unit 150 is brought to a halt, for example, the stopper pin 159 is pushed out to the transport path where the wide-mouthed preform 1 is passed. By this action, the wide-mouthed preform 1 is brought into contact with the stopper pin 159, whereby the supply of the wide-mouthed preform 1 from the linear transport portion 151 to the rotary transport portion 152 is stopped.

While rotating in the same direction as the direction of transport of the transport members 20, the supply unit 110 sequentially receives the wide-mouthed preforms 1 rotationally transported by the rotary transport portion 152. Then, the supply unit 110 lowers the wide-mouthed preforms 1 and transports them to the transport members 20. The supply unit 110 is configured to rotate in synchronization with the movement of the transport members 20, as is the star wheel 156.

The supply unit 110 according to the present embodiment is provided with a holding portion 111 for holding the wide-mouthed preforms 1 supplied from the slide transport unit 150 (rotary transport portion 152), and a first elevating/lowering portion 112 for raising or lowering the holding portion 111 at a predetermined timing. The holding portion 111 and the first elevating/lowering portion 112 are provided on a nearly circular rotating member 113 fixed coaxially with the driving sprocket 32. Upon rotation of the rotating member 113 together with the driving sprocket 32, the holding portion 111 is rotationally moved in synchronization with the movement of the transport member 20 in the curved transport path 31e.

A plurality of (15 in the present embodiment) the holding portions 111 are provided at predetermined intervals on the outer periphery of the rotating member 113. Each of the holding portions 111 includes a holding portion body 115 engaging a slide shaft 114 erected on the rotating member 113, a first support member 116 mounted on the lower end of the holding portion body 115, and a second support member 117 mounted on the upper end of the holding portion body 115. The holding portion 111 holds the wide-mouthed preform 1 from above and from below by the first support member 116 and the second support member 117. In the present embodiment, an urging member 118 composed of a coil spring or the like is provided between the holding portion body 115 and the rotating member 113, and the holding portion body 115 is always urged downward by the urging member 118.

The first elevating/lowering portion 112 has a first cam follower 119 provided on a shaft protruding from the holding portion body 115 radially inwardly of the rotating member 113, and a first cam member 120 provided on the rotating member 113. The first cam member 120 is formed in a nearly annular shape, except a notch 121, inwardly of the holding portions 111 on the rotating member 113 (see FIG. 2). The first elevating/lowering portion 112 is also provided with an actuator 122 for raising the holding portion 111, at a position corresponding to the notch 121.

As will be described in detail later, the holding portion 111 normally ascends or descents at a predetermined timing upon rolling of the first cam follower 119 over the first cam member 120.

The first support member 116 engages the lower side of the flange 4 of the wide-mouthed preform 1 to support the flange 4 from below. Concretely, the first support member 116 is composed of an arcuate member which is provided to protrude from the holding portion body 115 radially outwardly of the rotating member 113, and which has a slightly larger inner diameter than the diameter of the mouth 2 of the wide-mouthed preform 1.

The second support member 117 engages the bottom 5 of the wide-mouthed preform 1 from above to hold the wide-mouthed preform 1. The second supply member 117 has a concavity 123 opening downward and engaging the bottom 5 of the wide-mouthed preform 1, and is held to be ascendable and descendable with respect to the holding portion body 115. In detail, as shown in FIG. 3(a), an extension 124 is provided on the upper surface of the holding portion body 115 so as to extend from its upper part radially outwardly of the rotating member 113. To the upper surface of the second support member 117, one end of each of two cylindrical members 125 is fixed. The cylindrical member 125 is slidably inserted into a through-hole (not shown) provided in the extension 124, and has the other end fixed to a plate-shaped member 126. As shown here, the second support member 117 is connected to be ascendable and descendable with respect to the extension 124.

In the present embodiment, a contact portion 127 protruding downward is provided on a side of the second support member 117 facing the holding portion body 115. The contact portion 127 contacts the upper surface of the flange 4 of the wide-mouthed preform 1 supported by the first support member 116, with the second support member 116 in engagement with the bottom 5 of the wide-mouthed preform 1.

The supply unit 110 also has a second elevating/lowering portion 128 for temporarily raising the second support member 117 to a position above the wide-mouthed preform 1, namely, to a position at which the second support member 117 does not interfere with the wide-mouthed preform 1, in a delivery region A1 where the wide-mouthed preform 1 is delivered from the slide transport unit 150 to the holding portion 111. The second elevating/lowering portion 128 according to the predetermined embodiment is composed of a second cam follower 129 provided on a shaft protruding from an end of the plate-shaped member 126 on a side opposite to the holding portion body 115; and a second cam member 130 disposed outwardly of the holding portion 111 in the delivery region A1. When the second cam follower 123 rolls over the second cam member 130, the second support member 117 ascends or descends in the delivery region A1.

Furthermore, the supply unit 110 has a third elevating/lowering portion 131 (see FIG. 4(b)) for temporarily raising the second support member 117 to a position above the wide-mouthed preform 1, namely, to a position at which the rotationally moved second support member 117 does not interfere with the wide-mouthed preform 1 transported by the transport member 20, in a supply region A2 where the wide-mouthed preform 1 held by the holding portion 111 is supplied to the transport member 20. The third elevating/lowering portion 131 is composed of the second cam follower 129 provided on the plate-shaped member 126; and a third cam member 132 disposed outwardly of the holding portion 111 in the supply region A2. When the second cam follower 129 rolls over the third cam member 132, the second support member 117 makes an ascending or descending motion in the supply region A2.

The actions of the supply unit 110, particularly, the ascending and descending motions of the holding portion 111, will be described by reference to FIG. 2 to FIGS. 5(a) to 5(c). FIGS. 3(a), 3(b) to FIGS. 5(a) to 5(c) are views illustrating the states of the holding portion 111 at the positions A to G in FIG. 2.

The supply unit 110 is configured such that when the wide-mouthed preform 1 is to be supplied to the transport member 20, the wide-mouthed preform 1 is first delivered from the slide transport unit 150 to the holding portion 111 in the delivery region A1. That is, as shown in FIG. 3(a), when the holding portion 111 moves to the position A in FIG. 2, the wide-mouthed preform 1 is delivered from the slide transport unit 150 to the holding portion 111. As mentioned above, the holding portion 111 is rotated in synchronization with the movement of the transport member 20 and, at the position A, the transport member 20 is located below the holding portion 111.

At the position A, as shown in FIG. 3(a), the first cam follower 119 rolls over the upper surface of the first cam member 120, and the holding portion 111 rotationally moves at a site a predetermined distance above the transport path 31, namely, at a height corresponding to the slide transport unit 150. The second cam follower 129 rolls over the upper surface of the second cam member 130, and the second support member 117 rotationally moves while ascending to its upper limit position. That is, the second support member 117 rotationally moves at a height at which it does not interfere with the wide-mouthed preform 1. In this state, the wide-mouthed preform 1 is slidingly transported by the slide transport unit 150 and delivered to the holding portion 111. Concretely, the flange 4 of the wide-mouthed preform 1 slidingly transported by the slide transport unit 150 is supported by the first support member 116.

During movement of the holding portion 111 from the position A to the position B, the second cam follower 129 rolls over a downwardly sloping surface 130a (see FIG. 2) of the second cam member 130 and, accordingly, the second support member 117 lowers. As a result, at the position B, the second support member 117 engages the bottom 5 of the wide-mouthed preform 1, and the contact portion 127 contacts the upper surface of the flange 4 of the wide-mouthed preform 1 supported by the first support member 116 (see FIG. 3(b)). When the holding portion 111 is located at the position B, the wide-mouthed preform 1 is held by the first support member 116, the second support member 117 and the contact portion 127 in the up-and-down direction.

When the holding portion 111 moves from the position B to the position C, the first cam follower 119 rolls over a downwardly sloping surface 120a of the first cam member 120 and, accordingly, the holding portion 111 lowers to a height corresponding to the transport path (i.e., a lower limit position). As stated earlier, the holding portion body 115 constituting the holding portion 111 is urged downward by the urging member 118. Hence, the holding portion 111 is smoothly lowered to the lower limit position by this urging force.

Consequently, as shown in FIG. 4(a), when the holding portion 111 is located at the position C, the wide-mouthed preform 1 is placed on the transport member 20. The position C, moreover, corresponds to the notch 121 of the first cam member 120, and the first cam follower 119 once departs from the first cam member 120 and moves.

Then, with the wide-mouthed preform 1 being placed on the transport member 20, the holding portion 111 moves from the position C to the position D together with the transport member 20. During this motion, the first cam follower 119 passes below the first cam member 120. That is, the holding portion 111 rotationally moves while remaining at the lower limit position. The second cam follower 123 rolls over the upper surface of the third cam member 132 via an upwardly sloping surface 132a of the third cam member 132. In accordance with this movement of the second cam follower 129, the second support member 117 ascends. When the holding portion 111 is located at the position D, as shown in FIG. 4(b), the second support member 117 rotationally moves at a height at which it does not interfere with the wide-mouthed preform 1 (i.e., upper limit position). That is, during movement of the holding portion 111 from the position C to the position D, the engagement of the second support member 117 with the wide-mouthed preform 1 is released. Then, the wide-mouthed preform 1 is delivered to the transport member 20, and the transport member 20 is transported on the first linear transport path 31a.

The holding portion 111 rotationally moves from the position D to the position E, while the transport member 20 curvedly moves from the position A to the position D and then linearly moves on the first linear transport path 31a. As a result, the wide-mouthed preform 1 is delivered from the holding portion 111 to the transport member 20. That is, the first support member 116 of the holding portion 111 is separated from the wide-mouthed preform 1, and the wide-mouthed preform 1 is delivered to the transport member 20. During the rotational movement of the holding portion 111 from the position D to the position E, the second can follower 129 rolls over a downwardly sloping surface 132b of the third cam member and, accordingly, the second support member 117 lowers to the lower limit position (see FIG. 5(a)). That is, the second support member 117 lowers to the position at which the plate-shaped member 126 contacts the extension 124. Even during this motion, the first cam follower 119 passes below the first cam member 120.

Then, during the rotational movement of the holding portion 111 from the position E to the position F, the first cam follower 119 begins to roll over a first upwardly sloping surface 120b of the first cam member 120 and, accordingly, the holding portion 111 ascends. As shown in FIG. 5(b), when the holding portion 111 is located at the position F, the first cam follower 119 is situated near the middle of the first upwardly sloping surface 120b of the first cam member 120. While the holding portion 111 further rotationally moves from the position F to the position G, the first cam follower 113 rolls over the first upwardly sloping surface 120b of the first cam member 120, whereupon the holding portion 111 ascends to a site close to the upper limit position. That is, when the holding portion 111 is located at the position G, as shown in FIG. 5(c), the first cam follower 119 rolls over the upwardly sloping surface 120b of the first cam member 120, and lies nearly on the top of the first cam member 120. In short, when the holding portion 111 reaches the position G, the holding portion 111 has ascended nearly to the upper limit position.

Then, the first cam follower rolls over the upper surface of the first cam member, and the holding portion 111 is transported to the aforementioned position A at a height corresponding to the slide transport unit 150. During this process, the second cam follower rolls over the upper surface of the second cam member 130 via an upwardly sloping surface 130b of the second cam member 130, whereby, at the position A, the second support member 117 comes to the upper limit position, as mentioned above.

In the present embodiment, moreover, if a supply failure, for example, a failure in the appropriate placement of the wide-mouthed preform 1 on the transport member 20, with the holding portion 111 being at the position C, is detected, the holding portion 111 (holding portion body 115) is raised to a predetermined position by an actuator 122. In this case, while the holding portion 111 is moving from the position C to the position G, the first cam follower 113 rolls over the upper surface of the first cam member 120 via a second upwardly sloping surface 120c of the first cam member 120. That is, the holding portion 111 ascends to the upper limit position while holding the wide-mouthed preform 1, and rotationally moves to the position G without supplying the wide-mouthed preform 1 to the transport member 20. The wide-mouthed preform 1 held by the holding portion 111 at the position G is removed from the holding portion 111 and discharged to the outside, during its rotational movement from the position G to the position A, although an illustration for this motion is omitted.

With the molded article supply apparatus 100 according to the present invention, as described above, the wide-mouthed preforms 1 are held at predetermined intervals and transported in synchronization with the movement of the transport members. During this process, the wide-mouthed preforms 1 are lowered and supplied to the transport members 20. Consequently, even when the elevating/lowering rod 22 of the transport member 20 is protruded upwardly of the transport stand 21, the wide-mouthed preform 1 can be supplied satisfactorily to the transport member 20.

The wide-mouthed preforms 1 supplied to the transport members 20 by the molded article supply apparatus 100 configured as above are transported on the transport path 31 by the transport members 20, and supplied to the heating units 40 provided along the first to third linear transport paths 31a to 31c (see FIG. 1).

The heating units 40 have been unitized so as to have predetermined lengths in directions along the first to third linear transport paths 31a to 31c. The heating unit 40 has heaters 41 on both sides interposing the mouths 2 of the wide-mouthed preforms 1. The wide-mouthed preform 1 has the periphery of the mouth 2 heated when passing through the heating units 40 to undergo crystallization.

Figure 6:
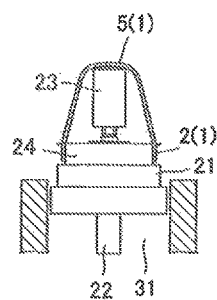
FIG. 6 is a view illustrating the state of a transport member bearing a molded article on a transport path.

When passing through the heating units 40, the transport member 20 raises the elevating/lowering rod 22 to the upper limit position to push up the bottom of the wide-mouthed preform 1 by the pushup member 23 and, as shown in FIG. 6, holds the wide-mouthed preform 1, with the mouth 2 being separated from the transport stand. When the elevating/lowering rod 22 has been raised, the core 24 has been inserted into the mouth 2 of the wide-mouthed preform 1. The mouth 2 of the wide-mouthed preform 1 is heated from inside either by reflecting heat rays (infrared rays) from the heater 41 by the core 24, or by exposure to the potential heat of the core 24. In the heating unit 40, the wide-mouthed preform 1 is driven while being rotated on its axis so that the mouth 2 of the wide-mouthed preform 1 is uniformly heated in the circumferential direction.

With the molded article supply apparatus 100 according to the present invention, as described above, the wide-mouthed preform 1 can be supplied to the transport member 20 without the need to lower the elevating/lowering rod 22 greatly. Thus, the ascent or descent distance of the elevating/lowering rod 22 constituting the transport member 20 can be set to be relatively short. If the ascent or descent distance of the elevating/lowering rod 22 is long, sways of the wide-mouthed preform 1 are likely to become relatively great, when the wide-mouthed preform 1 is rotated on its axis in the heating unit 40, with the elevating/lowering rod being raised. However, the ascent or descent distance of the elevating/lowering rod 22 can be kept short, by employing the molded article supply apparatus 100 according to the present invention. Even when the wide-mouthed preform 1 is rotated on its axis, with the elevating/lowering rod 22 being raised, therefore, sways of the wide-mouthed preform 1 can be minimized, and the mouth can be heated more uniformly. Since the ascent or descent distance of the elevating/lowering rod 22 is rendered short, moreover, the degree of wear of the elevating/lowering rod 22 and related components such as bearings related thereto can be kept low, and the risk of damage to the elevating/lowering rod 22 and related components can be suppressed.

The cooling unit 50 has cooling fans (not shown) for cooling the mouths 2 of the wide-mouthed preforms 1 heated at the crystallization temperature. When passing through the cooling unit 50, the transport member 20 holds the wide-mouthed preform 1, while separating the mouth 2 from the transport stand and inserting the core 24 into the mouth 2, in the same manner as during passage through the heating unit 40.

Figure 7:
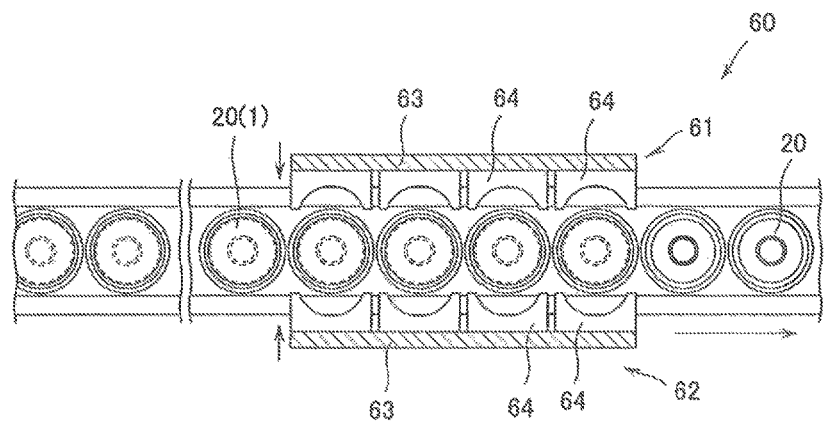
FIG. 7 is a view illustrating a withdrawal unit of the molded article supply apparatus according to the present invention.
Figure 8:
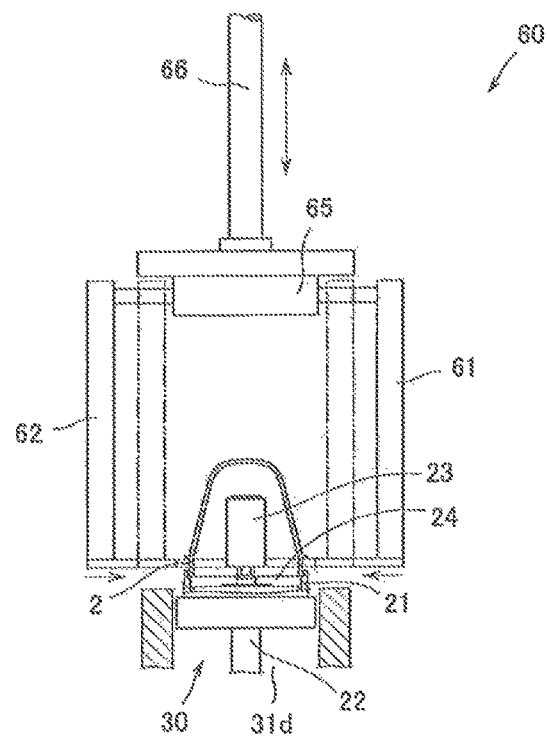
FIG. 8 is a view illustrating the withdrawal unit of the molded article supply apparatus according to the present invention.

The withdrawal unit 60 is disposed downstream of the cooling unit 50 on the fourth linear transport path 31d, and withdraws the wide-mouthed preforms 1 cooled by the cooling unit 50 to the outside of the mouth crystallization apparatus 10. The withdrawal unit 60 according to the present embodiment is disposed above the transport path 31, and has a pair of grip members 61, 62 for gripping the wide-mouthed preform 1 from both sides of the transport path 31, as shown in FIGS. 7 and 8. The grip member 61 has a grip member body 63, and a plurality of chucks 64 contacting the mouths 2 of the wide-mouthed preforms 1 placed on the transport members 20. The chucks 64 are provided in correspondence with a plurality (e.g., 4) of the transport members 20 being fed successively. That is, each of the grip members 61, 62 is composed of the grip member body 63 disposed outwardly of the transport path 31, and the plural (e.g., four) chucks 64 formed like the teeth of a comb protruding from the grip member body 63 toward the transport path 31. The grip members 61, 62 are connected to a drive portion 65 constituted by an actuator device or the like, and are movable in the width direction of the transport path 31 (a direction perpendicular to the transport direction) by the drive portion 65. One end of a support shaft 66 is fixed to the top of the drive portion 65, and the other end side of the support shaft 66 is coupled to a frame member 67 (see FIG. 1). The support shaft 66 is configured to be ascendable and descendable, although an illustration for this feature is omitted. The support shaft 66 is also configured to be slidable along the frame member 67 from a region opposing the transport path 31 to the outside of the transport path 31.

When the transport member 20 is transported to the withdrawal unit 60, the elevating/lowering rod 22 lowers to the lower limit position. That is, the pushup member 23 is separated from the bottom 5 of the wide-mouthed preform 1, and the core 24 is lowered to a lower side of the mouth 2, whereby the wide-mouthed preform 1 is placed on the transport stand. In this state, the withdrawal unit 60 actuates the drive portion 65 to grip the four wide-mouthed preforms 1 simultaneously by the grip members 61, 62. Further, the grip members 61, 62 gripping the wide-mouthed preforms 1 are raised by the support shaft 66, and allowed to slide along the frame member 67 to a predetermined position of the transport path 31. At this predetermined position, the grip members 61, 62 are opened, and the wide-mouthed preforms 1 gripped thereby are withdrawn to the outside of the apparatus.

The present invention has been described above in connection with its one embodiment, but it is to be understood that the molded article supply apparatus of the invention is in no way limited to the above-described embodiment.

In the foregoing embodiment, for example, the molded article supply apparatus of the present invention has been described, with the mouth crystallization apparatus being taken as an example. The molded article supply apparatus of the present invention, however, can be applied to an apparatus other than the mouth crystallization apparatus, if it is equipped with a transport device for transporting transport members bearing wide-mouthed preforms along a transport path, for example, a blow molding apparatus for blow-molding wide-mouthed preforms. Moreover, the molded article supply apparatus of the present invention is suitable for the supply of wide-mouthed preforms, but needless to say, can supply molded articles other than wide-mouthed preforms.

EXPLANATIONS OF LETTERS OR NUMERALS

1 Wide-mouthed preform
10 Mouth crystallization apparatus
20 Transport member
30 Transport unit
40 Heating unit
50 Cooling unit
60 Withdrawal unit
61, 62 Grip member
63 Grip member body
64 Chuck
65 Drive portion
66 Support shaft
67 Frame member
100 Molded article supply apparatus
110 Supply unit
111 Holding portion
112 First elevating/lowering portion
113 Rotating member
114 Slide shaft
115 Holding portion body
116 First support member
117 Second support member
118 Urging member
119 First cam follower
120 First cam member
121 Notch
122 Actuator
123 Concavity
124 Extension
125 Cylindrical member
126 Plate-shaped member
127 Contact portion
128 Second elevating/lowering portion
129 Second cam follower
130 Second cam member
131 Third elevating/lowering portion
132 Third cam member
150 Slide transport unit
151 Linear transport portion
152 Rotary transport portion
153 Belt conveyor
154 First linear guide
155 Second linear guide

156 Star wheel
157 Arcuate guide
158 Notch
159 Stopper pin

The invention claimed is:

1. A molded article supply apparatus provided in a transport device, the transport device having transport members on which molded articles having a wide mouth structure are held in an inverted state, with the mouths facing downward, and which are provided with rod members to be inserted into the molded articles; and a transport path on which the transport members are continuously transported, the molded article supply apparatus comprising:

a supply unit disposed above the transport path, for holding the molded wide mouth articles in an inverted state, with the mouths facing downward, at predetermined intervals and lowering the molded wide mouth articles, while transporting the molded articles in synchronization with movement of the transport members, to supply the molded wide mouth articles to the transport members; and a slide transport unit for slidingly transporting the molded wide mouth article to the holding portion, wherein the supply unit has a second elevating/lowering portion for temporarily raising the second support member to a position above the molded wide mouth article in a delivery region where the molded wide mouth article is delivered from the slide transport unit to the holding portion.

2. The molded article supply apparatus according to claim 1, wherein
the supply unit has
a rotating member provided to be rotatable in accordance with a moving speed of the transport member,
holding portions provided at predetermined intervals on an outer periphery of the rotating member, for holding the molded wide mouth articles, and
a first elevating/lowering portion for raising or lowering each of the holding portions at a predetermined timing.

3. The molded wide mouth article supply apparatus according to claim 2, wherein
the molded wide mouth article has a barrel continuous with the mouth, a flange for separating the mouth and the barrel, and a bottom closing the barrel, and
the holding portion has a first support member for supporting the flange of the molded wide mouth article from below, and a second support member for engaging the bottom of the molded wide mouth article from above for support thereof.

4. The molded wide mouth article supply apparatus according to claim 3, wherein
the supply unit has a third elevating/lowering portion for temporarily raising the second support member to a position above the molded article in a supply region where the molded wide mouth article is supplied from the holding portion to the transport member.

5. The molded wide mouth article supply apparatus according to claim 3, wherein
the second support member further has a contact portion, which contacts an upper surface of the flange, when the second support member supports the bottom of the molded wide mouth article.

6. The molded wide mouth article supply apparatus according to claim 3, wherein
the second support member further has a contact portion, which contacts an upper surface of the flange, when the second support member supports the bottom of the molded wide mouth article.

7. The molded wide mouth article supply apparatus according to claim 4, wherein
the second support member further has a contact portion, which contacts an upper surface of the flange, when the second support member supports the bottom of the molded wide mouth article.

* * * * *